C. L. PRESTON.
SLIDING CASTER.
APPLICATION FILED FEB. 26, 1920.

1,359,741. Patented Nov. 23, 1920.

INVENTOR
Charles L. Preston.
BY
Hardway & Cathey
ATTORNEYS.

UNITED STATES PATENT OFFICE.

CHARLES L. PRESTON, OF HOUSTON, TEXAS.

SLIDING CASTER.

1,359,741.  Specification of Letters Patent.  Patented Nov. 23, 1920.

Application filed February 26, 1920. Serial No. 361,492.

*To all whom it may concern:*

Be it known that I, CHARLES L. PRESTON, citizen of the United States, residing at Houston, in the county of Harris and State of Texas have invented certain new and useful Improvements in a Sliding Caster, of which the following is a specification.

This invention relates to new and useful improvements in a sliding caster.

One object of the invention is to provide a caster of the character described which is adapted to be applied to the lower ends of the legs of chairs, table and other articles of furniture and the like and which are provided for the purpose of protecting the furniture and of also protecting floors, carpets and other floor coverings over which articles of furniture are moved, as well as for the purpose of making the articles of furniture to which the casters are attached easily movable from place to place.

Another object is to provide a caster having securing prongs, which are set back from the outer margin of the caster so as not to split or mutilate the leg into which they are driven.

A further object of the invention is to provide a caster of the character described which may be easily casted or stamped out from sheet metal and given the desired form and which therefore may be cheaply and easily manufactured.

With the above and other objects in view, the invention has particular relation to certain novel features of construction and use, an example of which is given in this specification and illustrated in the accompanying drawings wherein—

Figure 5:
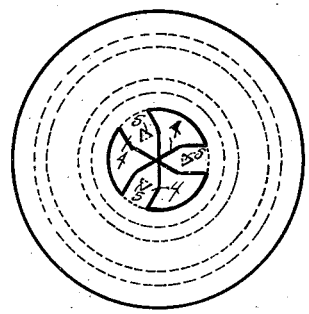
Fig. 5 is a plan view of a metallic disk which has been stamped out from sheet metal preparatory to being formed into a completed caster.
Figure 4:
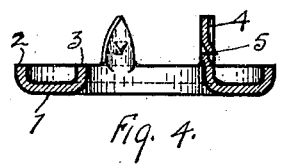
Fig. 4 is a transverse sectional view taken on the line 4—4 of Fig. 3.
Figure 3:
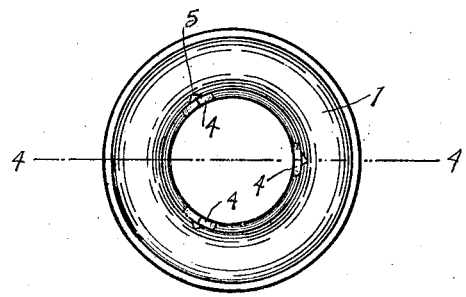
Fig. 3 is a plan view thereof.
Figure 1:
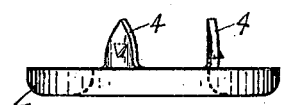
Figure 1 is a side view of the caster.
Figure 2:
Fig. 2 is a perspective view thereof shown on a small scale.

Referring now more particularly to the new drawings wherein like numerals of reference designate similar parts in each of the figures, the numeral 1 refers to a metallic ring, annular in form and whose outer and inner margins are upwardly curved forming the flanges 2 and 3 and giving to the underside of the disk an oval or convex form. Formed integrally with the inner flange 3 are the prongs 4 which extend parallel with relation to the axis of the caster. These prongs are curved, being convex on their outer and concave on their inner sides to more securely hold to the material of the article to which the caster is secured and the outer sides of these prongs have the barbs 5.

The caster is applied to the lower end of the leg by driving the prongs into the material and the barbs 5 are formed to so engage with said material that they will firmly secure the caster to the furniture leg, or other article.

It is to be noted that the prongs 4 are set in from the outer margin of the caster, so they will not come near the outer surface of the furniture leg and consequently they will not split or mutilate said leg when driven in.

What I claim is:

1. A sliding caster formed of an annular metallic ring, whose margins are turned at substantially right angles to the plane of the ring and prongs formed integrally with the inner margin and extending at substantially right angles to said plane.

2. A sliding caster formed of an annular metallic ring whose margins are turned at substantially right angles to the plane of the ring, prongs formed integrally with the inner margin and extending at substantially right angles to the plane of the ring, and barbs thrown outwardly from the material of the prongs.

In testimony whereof I have signed my name to this specification in the presence of two subscribing witnesses.

CHARLES L. PRESTON.

Witnesses:
R. M. SMITH,
WM. A. CATHEY.